US011556525B2

(12) United States Patent
Debaecker et al.

(10) Patent No.: US 11,556,525 B2
(45) Date of Patent: Jan. 17, 2023

(54) HYBRID ONLINE ANALYTICAL PROCESSING (OLAP) AND RELATIONAL QUERY PROCESSING

(71) Applicant: Business Objects Software LTD, Dublin (IE)

(72) Inventors: Stephane Debaecker, Argenteuil (FR); Raphael Geoffroy, Colombes (FR)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 471 days.

(21) Appl. No.: 16/577,713

(22) Filed: Sep. 20, 2019

(65) Prior Publication Data
US 2021/0089523 A1 Mar. 25, 2021

(51) Int. Cl.
| | |
|---|---|
| *G06F 17/30* | (2006.01) |
| *G06F 16/242* | (2019.01) |
| *G06F 16/245* | (2019.01) |
| *G06F 16/28* | (2019.01) |

(52) U.S. Cl.
CPC ........ *G06F 16/2423* (2019.01); *G06F 16/245* (2019.01); *G06F 16/283* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | | |
|---|---|---|---|---|
| 10,438,013 | B2* | 10/2019 | Jacob | G06F 16/24542 |
| 2007/0129970 | A1* | 6/2007 | Haider | G16H 50/20 |
| | | | | 706/54 |
| 2008/0016057 | A1* | 1/2008 | Bakalash | G06F 16/24539 |
| 2012/0173515 | A1* | 7/2012 | Jeong | G06F 16/258 |
| | | | | 707/718 |
| 2013/0325837 | A1* | 12/2013 | Soetarman | G06Q 30/0603 |
| | | | | 707/706 |
| 2014/0032588 | A1* | 1/2014 | Getmanets | G06F 16/283 |
| | | | | 707/760 |
| 2015/0081672 | A1* | 3/2015 | Wolf | G06F 16/24568 |
| | | | | 707/722 |
| 2015/0339358 | A1* | 11/2015 | Balasubramanyan | |
| | | | | G06F 16/254 |
| | | | | 707/602 |
| 2017/0364694 | A1* | 12/2017 | Jacob | G06F 16/24542 |
| 2018/0181613 | A1* | 6/2018 | Acharya | G06F 16/243 |

* cited by examiner

*Primary Examiner* — Hung D Le
(74) *Attorney, Agent, or Firm* — Fountainhead Law Group P.C.

(57) ABSTRACT

In some embodiments, a method receives a connection to a data source. The method analyzes metadata of the data source to determine a first type of metadata for a first type of database access and a second type of metadata for a second type of database access. The first type of metadata and the second type of metadata are combined into a data structure. Then, the method stores the data structure where the data structure is used to analyze a query to determine which of the first type of database access and the second type of database access to use for the query.

20 Claims, 5 Drawing Sheets

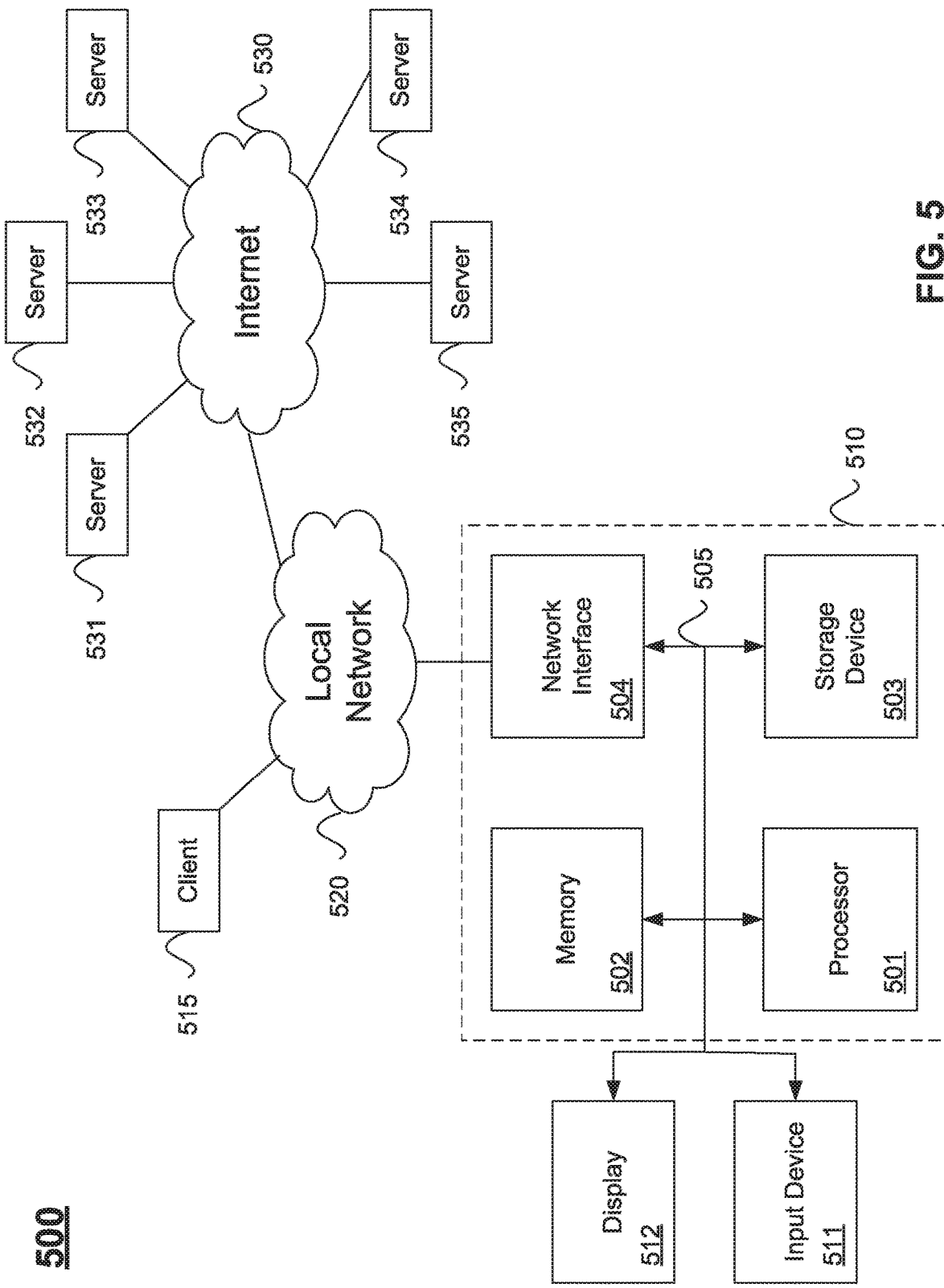

US 11,556,525 B2

HYBRID ONLINE ANALYTICAL PROCESSING (OLAP) AND RELATIONAL QUERY PROCESSING

BACKGROUND

A user may configure a connection to a data source with online analytical processing (OLAP) database access or relational database access. The access features for OLAP databases and relational databases are different. Typically, a user may design a document for a specific database connection. For example, if a user starts with a relational database connection, that user will have to use the relational database access to query objects in the relational database. However, if the user wants to query OLAP objects using the relational database connection, the user cannot take advantage of features offered by OLAP databases, such as hierarchies. Similarly, if a user selects an OLAP connection, the user may be able to use relational database queries, but these queries may be much slower than if a pure relational database connection was used.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 illustrates hardware of a special purpose computing machine according to one embodiment.

DETAILED DESCRIPTION

Described herein are techniques for a database system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

A system allows a user to select a connection to a data source without having to specify whether queries in the future will be based on a type of access, such as relational access queries or online analytical processing (OLAP) access queries. When the system receives a data source selection, the system generates metadata for OLAP queries. Also, the system extends the OLAP metadata with relational database metadata. The system then stores the OLAP metadata and the relational database metadata in a data structure, which may be referred to as a universe, that will be used when queries are performed on the data source.

When a user performs a query on a data source, the system analyzes the objects in the query to determine which access type to use, such as a relational database access or an OLAP database access. For example, if a query or a subquery is only based on relational database objects, then the system generates a query for the relational objects. However, if a query is based on OLAP objects, the system generates a query for OLAP objects.

System Overview

Figure 1:
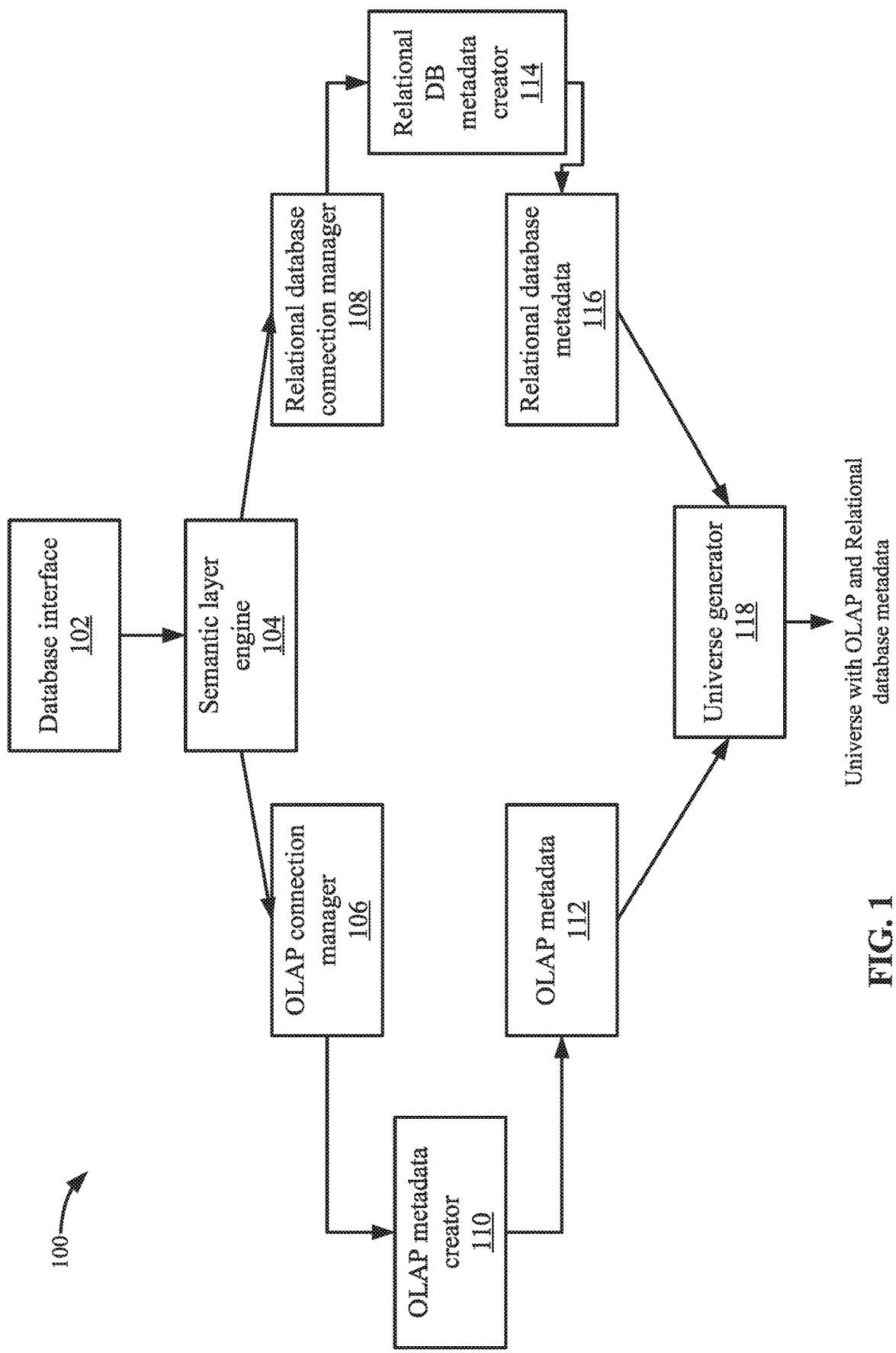
FIG. 1 depicts an example of a database system according to some embodiments.

FIG. 1 depicts an example of a database system 100 according to some embodiments. Database system 100 may include one or more databases (not shown) that store data. The following is used to generate a data structure, referred to as a universe, that is used to access the data in the databases. A universe may be a data structure that includes metadata that is used to generate queries on data stored in the databases.

A database interface 102 provides an interface to a user to generate a connection to a data source. A data source may be data that is stored in a database of database system 100. Interface 102 does not receive a specification of which type of access to use for the connection to the data source. Rather, a selection of the data source is received without specifying the type of access to use.

A semantic layer engine 104 connects to the databases to receive metadata about the data being stored. Semantic layer engine 104 supports receiving both relational database metadata and OLAP database metadata. A relational database is based on relations that are presented in a tabular form, such as tables that include a set of rows and columns. The relational database uses relational operators to manipulate the data in the tables. Relational database queries are typically performed in structured query language (SQL). An OLAP database is a multi-dimensional database that uses a multi-dimensional data model that allows for multi-dimensional analytical queries. Typical OLAP queries include consolidation (roll-up), drilldown, and splicing and dicing, and include hierarchical objects or hierarchical attributes.

An OLAP connection manager 106 may be a query engine that queries for the OLAP metadata. Then, an OLAP metadata creator 110 creates OLAP metadata 112. In some embodiments, OLAP metadata creator 110 creates a business layer (BLX) that is based on the OLAP metadata retrieved. The business layer describes the data that is stored in an OLAP data structure, such as a cube. For example, the business layer may describe the hierarchies in the data.

For relational access, a relational database connection manager 108 retrieves relational database metadata from the database system. Relational database metadata creator 114 creates relational database metadata 116. For example, relational database metadata creator 114 creates a basic data foundation (DFX) for relational database access. In some embodiments, relational database metadata 116 may be a table schema of the tables stored in the relational database system.

A universe generator 118 receives the OLAP metadata 112 and relational database metadata 116 and generates a universe with OLAP metadata and relational database metadata together. For example, universe generator 118 adds relational database metadata 116 to OLAP metadata 112. Accordingly, the universe may contain two possible data bindings. A first data binding is for OLAP access to the data source and a second relational database binding for relational access to the database source.

Query Processing

Figure 2:
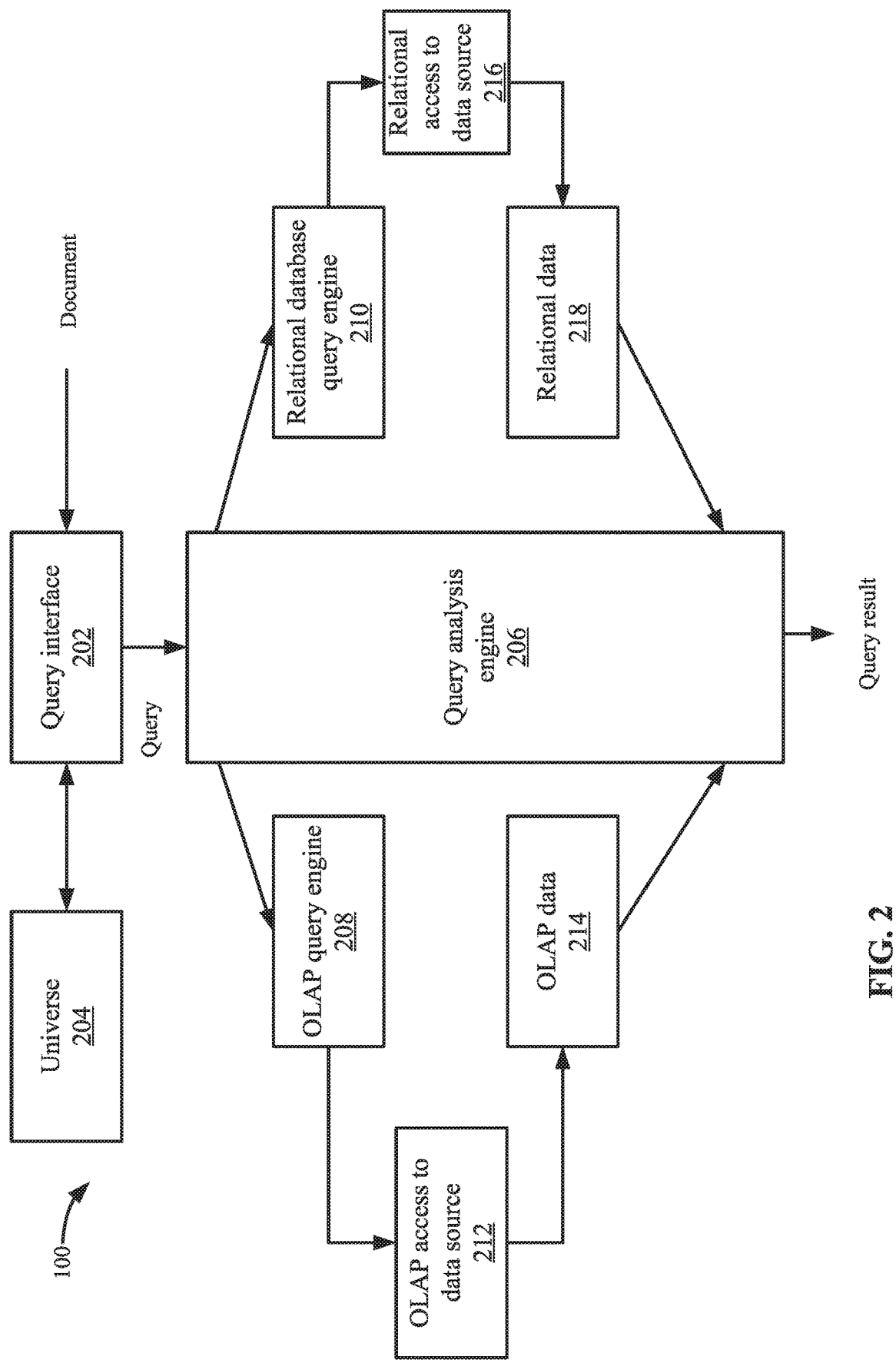
FIG. 2 depicts an example for processing queries according to some embodiments.

Upon generating a universe, database system 100 may process queries. FIG. 2 depicts an example for processing queries according to some embodiments. A query interface 202 receives a document from a user that specifies a query. For example, the document may include objects that are selected by a user to create a query. In some embodiments, query interface 202 uses universe 204 to provide a user with objects that can be selected to include in a query.

Once a user creates a document with a query, query analysis engine 206 may process the query. The process of selecting which of the OLAP database and the relational database to access may be transparent to a user. That is, in the document, a specific database is not selected to process the query. Rather, query analysis engine 206 selects which database to perform the query, and may perform queries using both OLAP database access and relational database access for subsets of the query.

Query analysis engine 206 analyzes portions of the query, such as objects in the query, to determine one of the access types to use to process the query. For example, query analysis engine 206 may select OLAP database access to retrieve objects in the query or a relational database access to retrieve objects in the query. Further, query analysis engine 206 may retrieve a subset of objects using one of the database access types, and then access other objects using another database access type. For example, query analysis engine 206 may use OLAP database access for a subset of the objects in a query and relational database access for a subset of objects in a query. The process of selecting which database to perform the query will be described in more detail below.

If query analysis engine 206 is querying the data source using OLAP database access, an OLAP query engine 208 generates information needed to perform the query using OLAP database bindings from universe 204. For example, OLAP query engine 208 may generate OLAP database bindings that are used to select data in data structures, such as cubes, for the data source. Cubes, dimensions, and measures can be bound to a data source in OLAP. The data source may be a relational data source. The OLAP database bindings may relate objects that do not exist in the relational data source to data in the data source and are used to retrieve data from the data source. Once the query is performed, OLAP data 214 is retrieved from the data source.

If query analysis engine 206 determines that a relational database query should be performed for some of the objects, relational database query engine 210 generates relational database bindings to query the data source at 216. Relational database query engine 210 may generate the relational database bindings using metadata from universe 204. In some embodiments, relational database query engine 210 may generate SQL statements from a table schema for the query to retrieve data from the relational data source. Upon executing the query, relational data 218 is retrieved. Query analysis engine 206 may receive OLAP data 214 and/or relational data 218 and provide a query result.

The above process may be transparent to a user that provided the query document. That is, the user did not select whether the query should query using OLAP database access or a relational database access.

Database Selection

Figure 3:
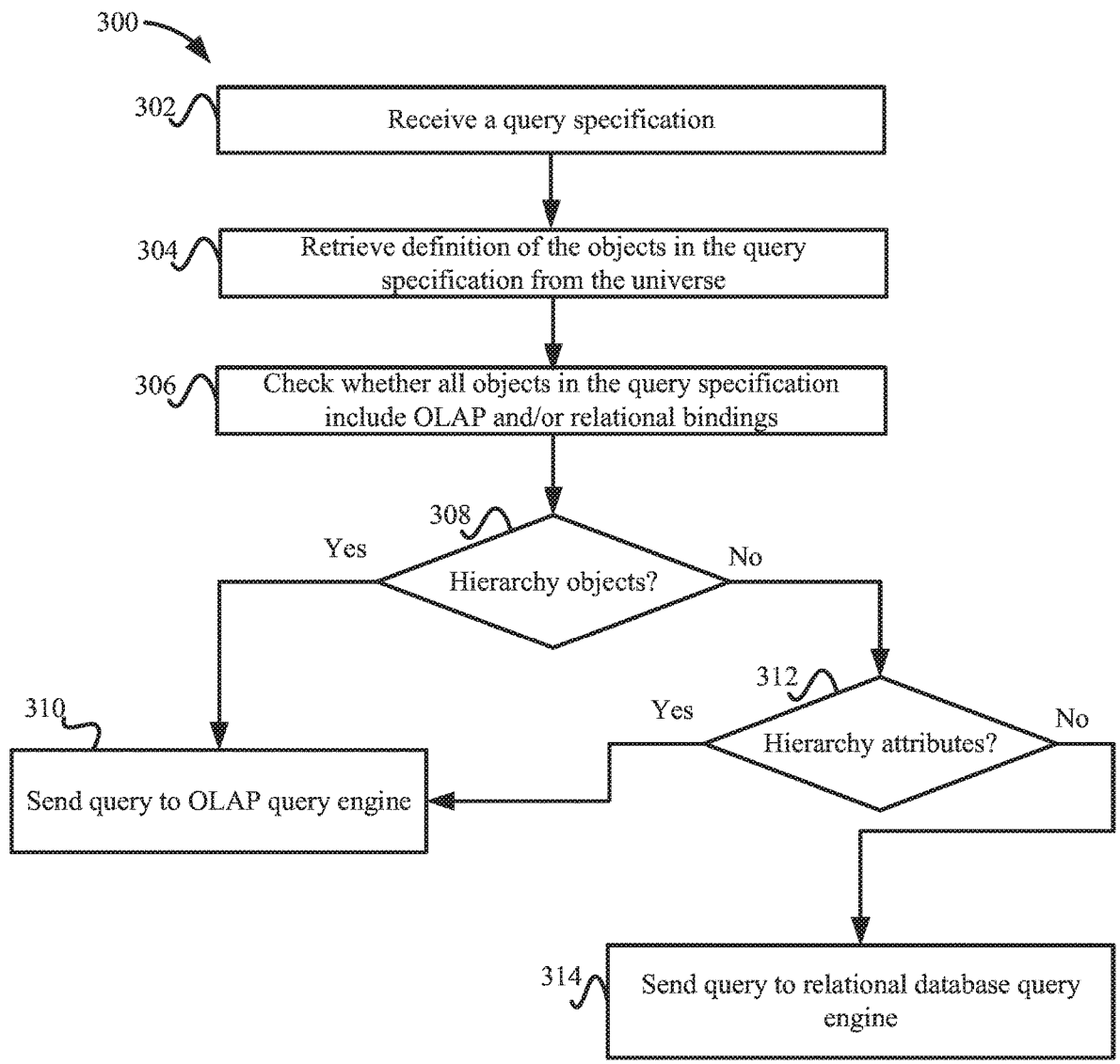
FIG. 3 depicts a simplified flowchart for analyzing a query to determine which database to access according to some embodiments.

FIG. 3 depicts a simplified flowchart 300 for analyzing a query to determine which database to access according to some embodiments. At 302, query analysis engine 206 receives a query specification. For example, the query specification may be included in a document provided by a user. In some examples, a query specification may be as follows:

Query (MAIN_QUERY)
Results: [
[uniqueName=Departments]
  [Identifier=HDepartments|DEPARTMENT_KEY] [memberSelection HDepartments|DEPARTMENT_KEY],
[uniqueName=Organization key]
  [Identifier=AORGANIZATION_KEY],
[uniqueName=Currency code]
  [Identifier=ACURRENCY_CODE],
[uniqueName=Scenario] [Identifier=ASCENARIO],
[uniqueName=Amount] [Identifier=MAMOUNT]

In the above, a main query is executed and Results includes all the objects requested by the main query. At 304, query analysis engine 206 retrieves a definition of objects in the query from universe 204. For example, an object identifier in the query specification is used to retrieve a definition of each object in universe 204, which may be metadata associated with the object. In some embodiments, the query specification may include a first description of objects, which may be a simple description of the objects. In universe 204, a more detailed description of the objects is provided. That is, additional metadata for the identified objects in the query specification are provided in universe 204. The additional description allows objects to be retrieved from the databases.

At 306, query analysis engine 206 checks whether all objects in the query specification include OLAP and/or relational bindings. This check ensures that all objects in the query specification contain objects that can be retrieved using OLAP database access and/or relational database access. The binding contains the capabilities of the objects. If one of the objects does not contain relational information, such as a relational binding of a table, aggregator, workload, or filter properties, then the query cannot be managed by relational database query engine 210. Also, objects may have an OLAP description, such as an OLAP binding, to ensure that there is a way to generate an executable query on one of the data sources. The OLAP binding may include analytical operations, such as consolidation, drilldown, and slicing and dicing operations. In this discussion, it is assumed that the objects include either an OLAP binding or a relational binding. For example, from the main query, query analysis engine 206 determines two additional subqueries (GroupingSets) of:

GS1: [[MAMOUNT][HDepartments|DEPARTMENT_KEY, ACURRENCY_CODE],
GS2: [[MAMOUNT][AORGANIZATION_KEY, ASCENARIO]]

GroupingSet 1 contains a hierarchy, and OLAP query engine 208 executes the subquery. GroupingSet 2 contains only a relational object, and can be handled by relational database query engine 210.

At 308, query analysis engine 206 determines whether hierarchy objects are included in the query specification. The hierarchy objects may define the objects in which hierarchies are applied. Attributes in an OLAP database may be organized in hierarchies. For example, connections may be a collection of attributes, which may be bound to one or more columns in a table. The attributes may be organized into hierarchies where one level may include aggregated values of attributes members across measures to which the dimension of the attribute is related. The hierarchies may allow queries to provide drilldown paths to browse data in the measures to which the attributed is related. A hierarchy object is a presentation on top of a dimension (flat). For example, the following may be an example of a dimension: Z_COUNTRY:

```
                    France
                    Japan
                    United States
                    . . .
```

The dimension above may be Z_Country. A hierarchy built on top a Z_Country could be:

```
              World (node)
                Europe (Node)
                  +France
                  . . .
                Asia (Node)
                  +Japan
                  . . .
                North America (Node)
                  +United States
```

But, hierarchy object could also be:

```
              Wine producers (node)
                +France
                +Unites States
              Not Assigned (node)
                +Japan
```

The nodes above can be consider as folders that include contents of the dimension. If there is at least one hierarchy in the query specification, then in some embodiments, at 310, query analysis engine 206 sends the query to OLAP query engine 208. OLAP query engine 208 may be used when the query specification includes a hierarchy because the OLAP database access provides the best performance to process hierarchies. Even if the relational database access can support hierarchies, the OLAP database access provides the best performance and a greater functionality support to access the hierarchies. If there are not any hierarchy objects, it is still possible that the query may include hierarchy attributes. For example, to be able to execute a query, query analysis engine 206 may need to add a reference to the hierarchy. At 312, query analysis engine 206 determines if the query specification includes hierarchy attributes. The hierarchy attributes may be levels or pure hierarchical attributes. The hierarchical attributes may have a reference on the hierarchy on which they belong. If hierarchy attributes exist in the query specification, then OLAP query engine 208 may generate a query for OLAP access to a data source at 212 and sends the query to OLAP query engine 208 at 310. An attribute of the above hierarchy could be a filter that allows the display of only the countries producing good wine as follows:

Z_COUNTRY
  +Country Hierarchy
    +Good Wine Producer

If the query is executed, with that attribute the query adds the hierarchy attributes:

World (node)
  Europe (Node)
    +France . . .
  North America (Node)
    +United States This also ensures that full support of the hierarchy attributes is provided because OLAP query engine 208 fully supports querying the data source using hierarchy attributes. Query analysis engine 206 reviews whether there are hierarchy objects or hierarchy attributes to quickly determine whether OLAP access is desired. When hierarchy objects or hierarchy attributes are included in a query, it is quicker to use OLAP query engine 208.

If hierarchy attributes are not included in the query specification, then at 314, query analysis engine 206 sends the query to relational database query engine 210. Relational database query engine 210 may generate a query, such a SQL query, to perform on the data source at 216.

New Document

Figure 4:
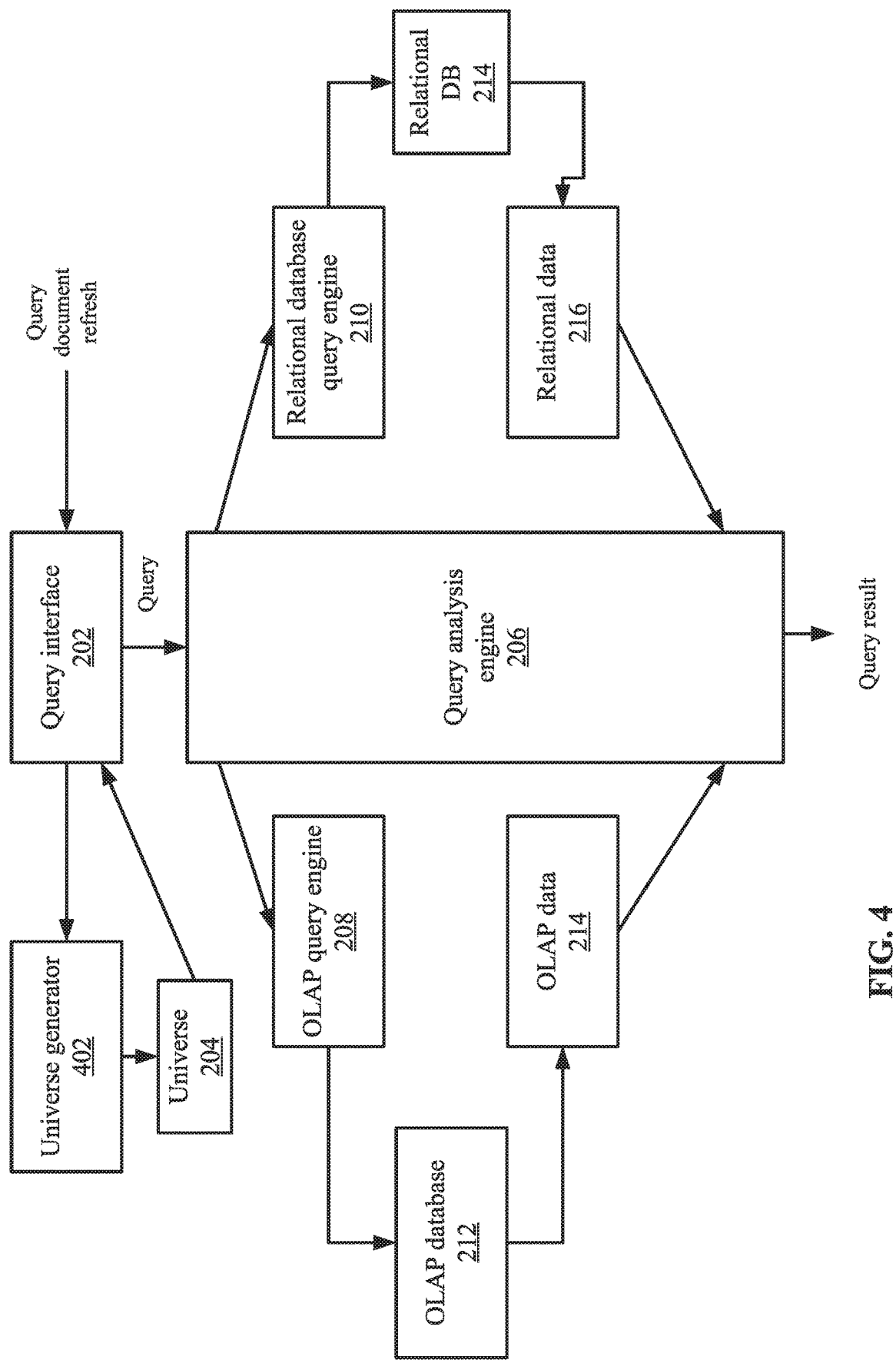
FIG. 4 depicts an example of processing a document refresh according to some embodiments.

When a new table is added or modified or a document is modified or created, the system may modify universe 204. FIG. 4 depicts an example of processing a document refresh according to some embodiments. Query interface 202 may receive a query document refresh. For example, the query may be edited or refreshed. When this occurs, a universe generator 402 may re-generate universe 204. Universe generator 402 may refresh the data in universe 204 based on the OLAP metadata and/or relational metadata. This ensures that universe 204 includes up-to-date metadata that can be used to process the query document refresh. In some embodiments, universe generator 402 may generate universe 204 differently from that described above. For example, this universe may contain less information than the first generated universe.

Conclusion

Accordingly, query analysis engine 206 receives a query document and can intelligently decide which database access to use based on the objects in the query. A user does not have to specify which database access to use. Rather, the user can select a connection to a data source, and query analysis engine 206 can determine how to access the data source.

Accordingly, a single type of connection may be defined for both relational database access and OLAP database access. Pure relational database queries may experience improved performance by using the relational database query engine instead of an OLAP query engine. Also, the OLAP and relational queries are performed transparently to a user. The optimal database access technology is chosen based on the objects in the query.

Embodiments

In some embodiments, a method includes: receiving, by a computing device, a connection to a data source; analyzing, by the computing device, metadata of the data source to determine a first type of metadata for a first type of database access and a second type of metadata for a second type of database access; combining, by the computing device, the first type of metadata and the second type of metadata into a data structure; and storing, by the computing device, the data structure, wherein the data structure is used to analyze a query to determine which of the first type of database access and the second type of database access to use for the query.

In some embodiments, the first type of access includes an online analytical processing (OLAP) type of access.

In some embodiments, the second type of access includes a relational type of access.

In some embodiments, the connection to the data source does not specify which of the first type of database access and the second type of database access to use to process queries.

In some embodiments, which of the first type of database access and the second type of database access to use for the query is determined after the query is received.

In some embodiments, the method further includes: analyzing one or more portions in the query to determine which of the first type of database access and the second type of database access to use to access the one or more portions.

In some embodiments, the method further includes: analyzing one or more portions in the query to determine if the one or more portions includes a hierarchical object.

In some embodiments, the method further includes: using the first type of access when the one or more portions includes the hierarchical object.

In some embodiments, the method further includes: analyzing one or more portions in the query to determine if the one or more portions includes a hierarchical attribute.

In some embodiments, the method further includes: using the first type of access when the one or more portions includes the hierarchical attribute.

In some embodiments, the method further includes: analyzing one or more portions in the query to determine if the one or more portions includes at least one of a hierarchical object and a hierarchical attribute.

In some embodiments, the method further includes: using the second type of access when the one or more portions does not include at least one of the hierarchical object and the hierarchical attribute.

In some embodiments, the method further includes: using the first type of access when the one or more portions does include at least one of the hierarchical object and the hierarchical attribute.

In some embodiments, the method further includes: using the first type of access to retrieve a first portion of data from the data source; and using the second type of access to retrieve a first portion of data from the data source.

In some embodiments, a non-transitory computer-readable storage medium contains instructions, that when executed, control a computer system to be operable for: receiving a connection to a data source; analyzing metadata of the data source to determine a first type of metadata for a first type of database access and a second type of metadata for a second type of database access; combining the first type of metadata and the second type of metadata into a data structure; and storing the data structure, wherein the data structure is used to analyze a query to determine which of the first type of database access and the second type of database access to use for the query.

In some embodiments, a method includes: receiving, by a computing device, a query for a data source, wherein the query for the data source does not specify which of a first type of database access and a second type of database access to use to process the query; analyzing, by the computing device, one or more portions in the query to determine which of the first type of database access and the second type of database access to use to access the one or more portions; selecting, by the computing device, one of the first type of database access and the second type of database access; retrieving, by the computing device, one of a first type of metadata and a second type of metadata from a data structure based on which of the one of the first type of database access and the second type of database access is selected; and accessing, by the computing device, the data source using the one of the first type of metadata and the second type of metadata to determine a result for the query.

In some embodiments, the method further includes: analyzing one or more portions in the query to determine if the one or more portions includes at least one of a hierarchical object and a hierarchical attribute.

In some embodiments, the method further includes: using the second type of access when the one or more portions does not include at least one of the hierarchical object and the hierarchical attribute.

In some embodiments, the method further includes: using the first type of access when the one or more portions does include at least one of the hierarchical object and the hierarchical attribute.

In some embodiments, the method further includes: using the first type of access to retrieve a first portion of data from the data source; and using the second type of access to retrieve a first portion of data from the data source.

System

FIG. 5 illustrates hardware of a special purpose computing machine according to one embodiment. An example computer system 510 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 503 may include source code, binary code, or software files for performing the techniques above, for example. Storage device and memory are both examples of computer readable storage mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information through the network interface 504 across a local network 520, an Intranet, or the Internet 530. In the Internet example, software components or services may reside on multiple different computer systems 510, clients 515, or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a connection to a data source;
analyzing, by the computing device, metadata of the data source to determine a first type of metadata for a first type of database access and a second type of metadata for a second type of database access, wherein the first type of metadata relates to hierarchies in online analytical processing (OLAP) data of the data source and the second type of metadata relates to table schemas of a relational database of the data source;
combining, by the computing device, the first type of metadata and the second type of metadata into a data structure; and
storing, by the computing device, the data structure, wherein the data structure is used to analyze a query to determine which of the first type of database access and the second type of database access to use for the query.

2. The method of claim 1, wherein the first type of access comprises an online analytical processing (OLAP) type of access.

3. The method of claim 2, wherein the second type of access comprises a relational type of access.

4. The method of claim 1, wherein the connection to the data source does not specify which of the first type of database access and the second type of database access to use to process queries.

5. The method of claim 1, wherein which of the first type of database access and the second type of database access to use for the query is determined after the query is received.

6. The method of claim 1, further comprising:
analyzing one or more portions in the query to determine which of the first type of database access and the second type of database access to use to access the one or more portions.

7. The method of claim 1, further comprising:
analyzing one or more portions in the query to determine if the one or more portions includes a hierarchical object.

8. The method of claim 7, further comprising:
using the first type of access when the one or more portions includes the hierarchical object.

9. The method of claim 1, further comprising:
analyzing one or more portions in the query to determine if the one or more portions includes a hierarchical attribute.

10. The method of claim 9, further comprising:
using the first type of access when the one or more portions includes the hierarchical attribute.

11. The method of claim 1, further comprising:
analyzing one or more portions in the query to determine if the one or more portions includes at least one of a hierarchical object and a hierarchical attribute.

12. The method of claim 11, further comprising:
using the second type of access when the one or more portions does not include at least one of the hierarchical object and the hierarchical attribute.

13. The method of claim 11, further comprising:
using the first type of access when the one or more portions does include at least one of the hierarchical object and the hierarchical attribute.

14. The method of claim 1, further comprising:
using the first type of access to retrieve a first portion of data from the data source; and
using the second type of access to retrieve a first portion of data from the data source.

15. A non-transitory computer-readable storage medium containing instructions, that when executed, control a computer system to be operable for:
receiving a connection to a data source;
analyzing metadata of the data source to determine a first type of metadata for a first type of database access and a second type of metadata for a second type of database access, wherein the first type of metadata relates to hierarchies in online analytical processing (OLAP) data of the data source and the second type of metadata relates to table schemas of a relational database of the data source;
combining the first type of metadata and the second type of metadata into a data structure; and
storing the data structure, wherein the data structure is used to analyze a query to determine which of the first type of database access and the second type of database access to use for the query.

16. A method comprising:
receiving, by a computing device, a query for a data source, wherein the query for the data source does not specify which of a first type of database access and a second type of database access to use to process the query;
analyzing, by the computing device, one or more portions in the query to determine which of the first type of database access and the second type of database access to use to access the one or more portions, wherein the first type of metadata relates to hierarchies in online analytical processing (OLAP) data of the data source and the second type of metadata relates to table schemas of a relational database of the data source;

selecting, by the computing device, one of the first type of database access and the second type of database access;

retrieving, by the computing device, one of a first type of metadata and a second type of metadata from a data structure based on which of the one of the first type of database access and the second type of database access is selected; and accessing, by the computing device, the data source using the one of the first type of metadata and the second type of metadata to determine a result for the query.

17. The method of claim 16, further comprising:
analyzing one or more portions in the query to determine if the one or more portions includes at least one of a hierarchical object and a hierarchical attribute.

18. The method of claim 17, further comprising:
using the second type of access when the one or more portions does not include at least one of the hierarchical object and the hierarchical attribute.

19. The method of claim 17, further comprising:
using the first type of access when the one or more portions does include at least one of the hierarchical object and the hierarchical attribute.

20. The method of claim 16, further comprising:
using the first type of access to retrieve a first portion of data from the data source; and
using the second type of access to retrieve a first portion of data from the data source.

* * * * *